2,930,743
Patented Mar. 29, 1960

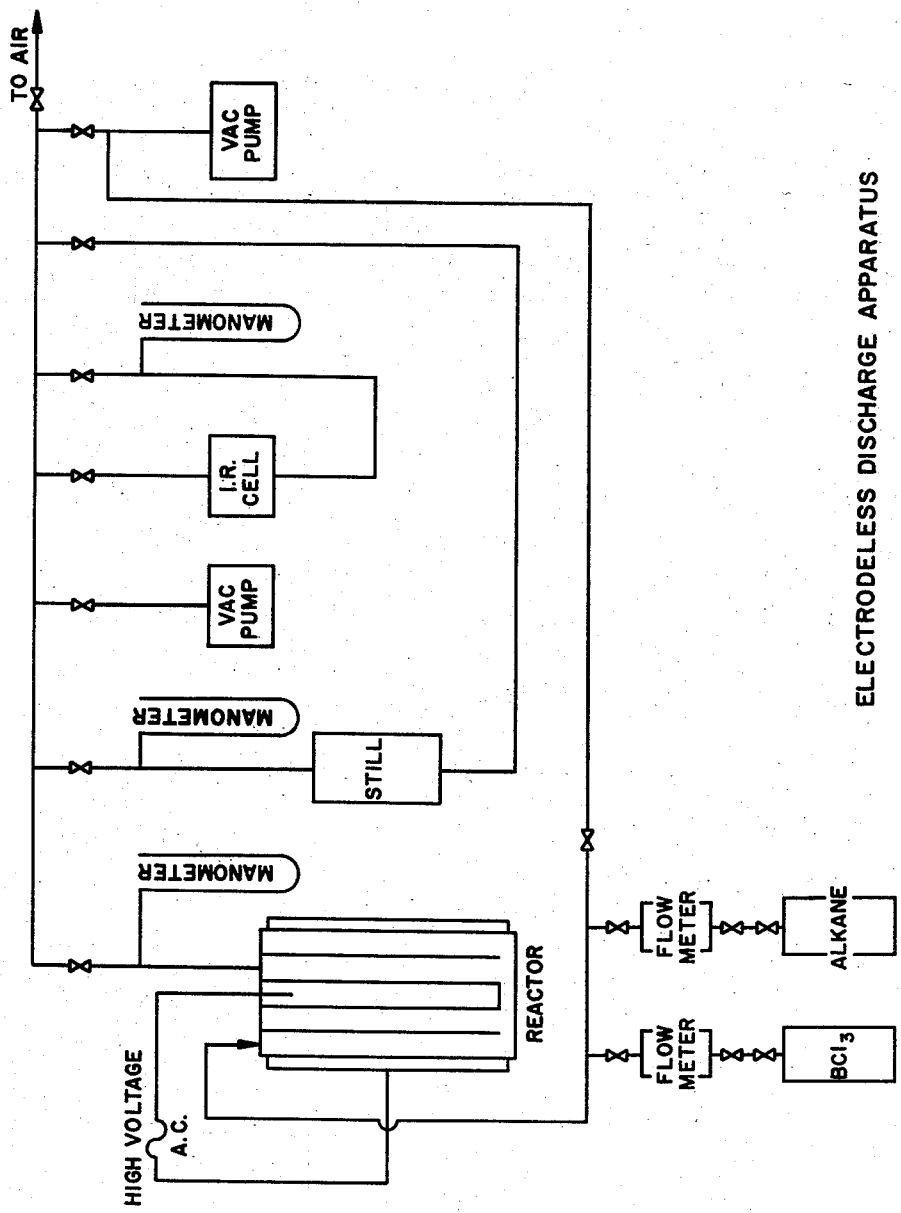

2,930,743
PRODUCTION OF ALKYLCHLOROBORANES

William H. Schechter, Zelienople, and Roy M. Adams, Darlington, Pa., assignors, by mesne assignments, to Callery Chemical Company, Pittsburgh, Pa., a corporation of Pennsylvania Application December 21, 1955, Serial No. 554,508

4 Claims. (Cl. 204—165)

This invention relates to the production of alkylchloroboranes and in particular it relates to a new and useful method of preparing methylchloroboranes such as monomethyldichloroborane, $BCH_3Cl_2$, and monochlorodimethyl borane, $B(CH_3)_2Cl$, by the reaction of methane with boron trichloride in an electric discharge.

There is very little known about methods for preparing the alkylchloroboranes. In British Patent 618,358, it is stated that such compounds are formed as intermediates in the reaction of a boron halide with an alkyl halide at elevated temperatures in the presence of aluminum or zinc, but that the principal product is an alkyl borane. More recently, it has been found that alkylchloroboranes can be prepared by the reaction of boron trichloride with an alkyl borane such as trimethylborane, $(CH_3)_3B$, or triethylborane, $(C_2H_5)_3B$. The latter method is indirect because the trialkylborane must first be prepared before reaction with boron trichloride. It would therefore be highly desirable if a method for producing alkylchloroboranes, and methylchloroboranes in particular, could be developed which utilized readily available starting materials such as boron trichloride and the lower alkanes.

It is one object of this invention to provide a new and useful method for the production of alkylchloroboranes.

A further object is to provide a simple and economical method for producing methylchloroboranes by the reaction of boron trichloride with methane in an electric discharge.

A still further object is to provide a method for producing alkylchloroboranes from cheap and readily available starting materials.

Other objects will appear from time to time throughout the following specification and appended claims.

This invention is based upon the discovery that a lower alkane, such as methane, ethane or propane, will react with boron trichloride in the presence of an electric discharge to form alkylchloroboranes. With methane and $BCl_3$ as the starting reactants, the reactions can be illustrated as follows:

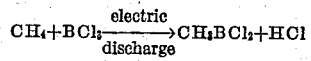

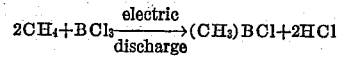

The type of electric discharge used may be an electrodeless discharge or a glow discharge but the former type is preferred for best results.

The apparatus used to carry out the above reaction is shown in the accompanying schematic diagram. The reactor was of the conventional glass type used in electrodeless discharge experiments.

In one series of experiments, methane and boron trichloride in a volume ratio of 1:1 and 3:1 were subjected to an electrodeless discharge at normal and elevated temperatures for various intervals of time with the results shown in the following table:

| Current in milliamps. | | Voltage in kv. | Temp., °C. | Reaction time in mins. | Percent Vol. of $BCl_3$ in gas stream | | Nature of Product |
|---|---|---|---|---|---|---|---|
| Initial | Final | | | | Initial | Final | |
| 21 | 32 | 13.1 | 27 | 12 | 25.3 | 10.1 | Liq.+gas. |
| 22 | 23 | 14.3 | 27 | 30 | 51.2 | 36.7 | Liq.+gas. |
| 21 | 21 | 13.6 | 130 | 30 | 53.1 | 42.7 | Liq.+gas. |
| 22 | 40 | 13.8 | 132 | 30 | 55.2 | 39.7 | Liq.+gas. |
| 36 | 120 | 14.8 | 175 | 15 | 28.3 | 11.0 | Mainly liquid. |

It is apparent from the data obtained that methane does react with $BCl_3$ at a temperature from 27°–175° C. in the presence of an electrodeless discharge. Infrared spectra of the gaseous products showed strong absorption bands for boron-carbon bonds and a weaker absorption band for boron-chlorine bonds. This evidence confirmed the presence of methylchloroboranes but no attempt was made to isolate the pure compounds from the complex gaseous mixture. Liquid products are also formed which are believed to be polymeric condensation products of boron trichloride and methane. A low boron content in the initial gas mixture results in an increased proportion of these liquids.

In another series of experiments, ethane and propane respectively were subjected to an electrodeless discharge in the presence of $BCl_3$ using a current of 22 milliamperes and a voltage of 22 kilovolts with the following results:

| Alkane Used | Temp., °C. | Reaction time in mins. | Percent Vol. of $BCl_3$ in gas stream | | Percent Vol. of Alkane in gas stream | | Nature of Product |
|---|---|---|---|---|---|---|---|
| | | | Initial | Final | Initial | Final | |
| Ethane | 108 | 30 | 24.7 | 9.4 | 75.3 | 4.5 | Liq.+gas. |
| Propane | 26 | 30 | 35.3 | 31.2 | 64.7 | 61.3 | Gas. |

The above data show that both ethane and propane react with $BCl_3$ under the conditions used but the rate of reaction decreases as the molecular weight of the alkane increases. The products obtained in each run were identified by infrared spectra as complex mixtures of ethyl and propyl chloroboranes respectively.

The alkylchloroboranes provide intermediates useful for various purposes. Thus, Auten and Kraus, J.A.C.S., 74, 3398–3401 (1952), describe the reaction of dibutylchloroborane and sodium-potassium alloy in diethyl ether to produce either tributylborane or, in the presence of excess alloy, a compound $MB(C_4H_9)_2$ where M is sodium or potassium. Also, Goubeau, Fiat. Review of German Sciences, Inorganic Chemistry, Part I, p. 215–218 reports the preparation of alkyl boronic acids by hydrolysis of alkyl haloboranes, according to the equation:

$$RBX_2 + 2H_2O = RB(OH)_2 + 2HX$$

The boronic acids are in turn useful in preparing polymeric boron amides, as shown, for example, in U.S. Patent No. 2,517,944.

Having thus described this invention fully and completely as required by the patent statutes and included what is now considered to be its best embodiment, it should be understood that other variations are possible and that within the scope of the appended claims this invention may be practiced otherwise than as specifically described.

What is desired to be claimed and secured by United States Patent is:

1. A method of producing alkylchloroboranes which comprises subjecting a mixture of boron trichloride and a lower alkane in which the volume ratio of alkane to boron trichloride is about 1:1 to 3:1 to an electrodeless electric discharge, and recovering alkylchloroborane from the reaction product.

2. A method according to claim 1 in which the alkane is selected from the class consisting of methane, ethane and propane.

3. A method according to claim 1 in which the reaction is carried out within the temperature range from about 25° C. to about 180° C.

4. A method of producing methylchloroboranes which comprises subjecting a mixture of boron trichloride and methane in which the volume ratio of methane to boron trichloride is about 1:1 to 3:1 to an electrodeless electric discharge at about room temperature, and recovering methylchloroborane from the reaction product.

References Cited in the file of this patent
UNITED STATES PATENTS 2,405,019    Dalin _____ July 30, 1946

OTHER REFERENCES

Stock: "Hydrides of Boron and Silicon," pages 48, 52, Cornell University Press, 1933.

Becher: "Zeitschrift für anorganische und allgemeine Chemie," vol. 271, pages 243–256 (1952).